(No Model.)
G. H. COATES.
FLEXIBLE SHAFT.
No. 486,852. Patented Nov. 29, 1892.
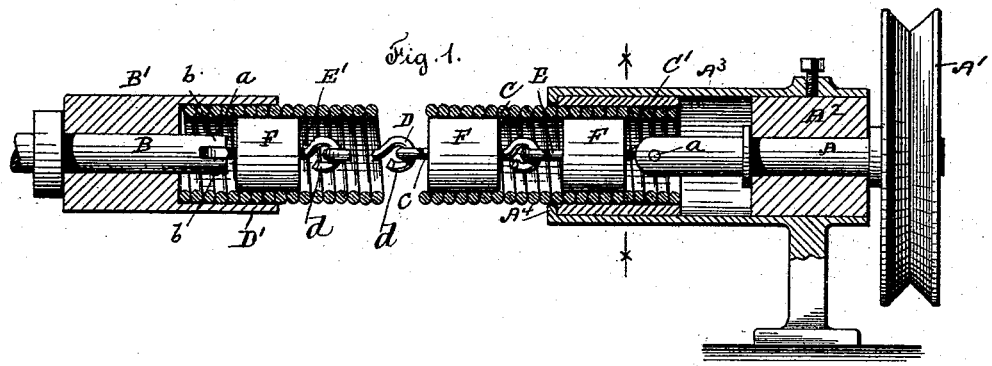
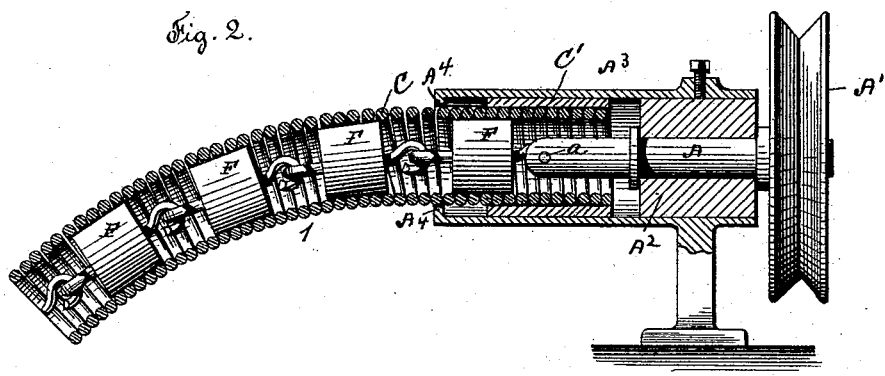
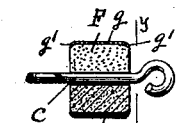
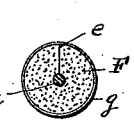
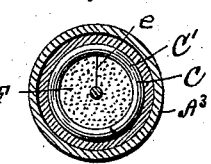
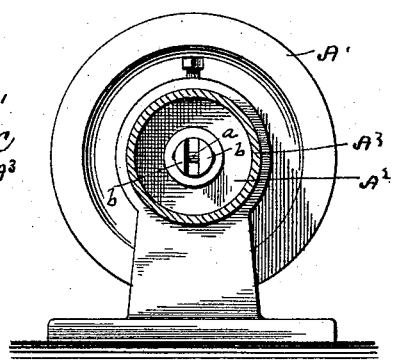
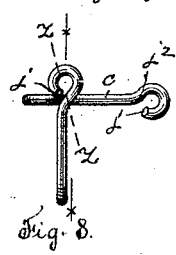
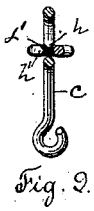
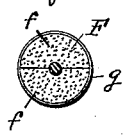
Witnesses
Chas. F. Schmelz.
John E. Wakefield
Inventor
George H. Coates,
By his Attorney
Rufus B. Fowler

UNITED STATES PATENT OFFICE.

GEORGE H. COATES, OF WORCESTER, MASSACHUSETTS.

FLEXIBLE SHAFT.

SPECIFICATION forming part of Letters Patent No. 486,852, dated November 29, 1892.

Application filed April 14, 1890. Serial No. 347,906. (No model.)

*To all whom it may concern:*

Be it known that I, GEORGE H. COATES, a citizen of the United States, and a resident of Worcester, in the county of Worcester and State of Massachusetts, have invented a new and useful Improvement in Flexible Shafts, of which the following is a specification, reference being had to the accompanying drawings, forming a part of the same, and in which—

Figure 1 represents a portion of a flexible shaft embodying my invention. Fig. 2 represents a portion of the flexible shaft slightly bent or curved. Fig. 3 is a sectional view of the cylindrical shell or sleeve shown on line X X, Fig. 1, with the flexible shaft removed. Fig. 4 is a sectional view on line X X, Fig. 1. Fig. 5 is an end view of one of the bearings for the links forming the chain with the link shown in sectional view on line Y Y, Fig. 6. Fig. 6 represents one of the links of the chain with the washer in which the link is journaled, shown in vertical central sectional view. Fig. 7 is an end view similar to that shown in Fig. 5 of one of the washers, in which the links are journaled, but made in halves. Fig. 8 represents two of the chain-links in the position in which they are detached; and Fig. 9 is a sectional view on line Z Z, Fig. 8.

Similar letters refer to similar parts in the several views.

My invention relates to certain improvements in what are known as "flexible shafts" for the transmission of rotary motion in other than a right line.

In the drawings I have represented a portion of a flexible shaft shown as employed for the purpose of transmitting the rotary motion of the shaft A to the shaft B. The shaft A receives rotary motion through the belt-pulley A' and is journaled in the bearing $A^2$, from one side of which extends the sleeve $A^3$, to receive the end of the spiral coil C, which forms the sheath or covering for the chain D. The spiral coil is attached to a short sleeve C', which is capable of sliding within the sleeve $A^3$, and in which it is retained by means of the lip $A^4$. The opposite end of the spiral coil C is attached to the sleeve D', which in the present instance forms a part of the journal-bearing B', in which the shaft B is journaled.

The inner ends of the shafts A and B are bifurcated to receive the ends of the links E E', which are hooked upon the hardened steel pins $a$, held in the prongs $b\ b$ of the shafts. Each of the links in D consists of a tempered steel wire hooked at its ends, so as to bring the central section $c$ between the hooks $d\ d$, coincident with the axis of the chain. The central straight section $c$ of each link is journaled in a bearing in the cylindrical blocks or washers F, which are formed of rawhide, vulcanized fiber, Babbitt metal, brass, or other material suitable for a journal-bearing. When the washers F are made of rawhide or similar material, I usually make them in a single piece with a central hole, as represented in Fig. 5, and by cutting them apart from the center to the periphery on one side, as shown at $e$, Fig. 5, the washers are easily sprung over the links. If the washers are made of metal, I prefer to make them in halves, as shown in Fig. 7, in which $f\ f$ represent the two halves divided by a diametrical line. The washers whether made in a single piece or in halves, as described, are inclosed in a shell or sleeve $g$ of sheet metal with its edges slightly turned downward, as at $g'\ g'$, Fig. 6, to prevent the sleeve $g$ from sliding laterally upon the washer F.

The washers F fill the bore of the spiral coil C, and as the friction between the outer surface of the washers and the interior of the coil C is greater than the friction of the journal-bearing of the section $c$ of the chain-link the link will rotate freely in the washer F, and holding each of the links in the center of the coil and preventing the kinking of the chain. As the shaft A is rotated, its motion is imparted to the first link connected with the shaft and by that to the next succeeding link and so on throughout the entire length of the chain to the shaft B, each of the links rotating within its own washer. When the shaft is employed in a straight line, the length of the chain corresponds with the length of the spiral coil, as shown in Fig. 1; but in case the shaft is used in a curved line, as shown in Fig. 2, the concave side of the coil remains of the same length as the coils are when wound closely together, and as the chain is not capable of expansion or stretching it follows that it will be necessary to provide some means by which the concave side of the coil can yield, and this is accomplished by attaching the end of the coil C to the sleeve C', which is inclosed in the sleeve $A^3$ and capable of sliding therein.

In Fig. 2 the portion of the shaft is represented as curved, and as the length of the concave side of the coil C is less than the axial line of the shaft through the center of the chain the coil will be forced into the sleeve $A^3$ and away from the lip $A^4$, and as the shaft is again straightened the sleeve C' will be drawn out against the lip $A^4$, as shown in Fig. 1. The ends of the wire forming each of the links in the chain are preferably made V-shaped, as represented at $h\ h'$, Fig. 9, and when the ends of the links are bent into the hook form the points $j'$ of the V-shaped ends of the wire are brought close enough to the body of the wire to prevent the disengagement of the links when the chain is in use. When it is desired to unhook the links from each other they are brought into the position shown in Fig. 8, so the opening in one link will correspond with the opening in the other link, allowing the V-shaped end $j'$ of one hook to enter the space between the V-shaped end and the body of the wire at $j^2$, permitting the links to be separated.

I am aware that a flexible shaft has been made consisting of a chain composed of a series of links inclosed within a coil of wire, forming a sheath or envelope. I am also aware that a cylindrical block has been employed to fill a helical wire coil forming the ends of the coupled sections of a flexible shaft, in which blocks portions of the central chain are journaled. Such blocks are shown and described in the Letters Patent No. 401,681, issued April 16, 1889. In the flexible shaft therein shown and described the blocks forming the ends of the coupled sections are attached to the helical wire coil and only a portion of the block is included within the coil. Such I do not claim, broadly.

The cylindrical washers F, although filling the bore of the spiral coil C, are not attached to the coil, but are capable of longitudinal movement therein, or, more accurately, to allow the movement of the coils upon the surface of the washers so they will not interfere with the flexibility of the shaft, and as it is impossible to string the washers upon the links, owing to the hooked ends of the links, I form each of the washers with a radial opening upon one side of its center so it may be slipped over the central section of the link, and I inclose the washer, when in position upon the link, with a tubular sleeve $g$, having its ends turned slightly inward to hold the sleeve in place and also to facilitate the longitudinal movement of the sleeve and its inclosed washer within the helical coil C.

What I do claim as my invention, and desire to secure by Letters Patent, is—

1. In a flexible shaft, the combination of a chain having links provided with a straight central section $c$ and formed of a single wire coincident with the axis of the shaft, a helical wire coil inclosing said chain, and circular washers inclosing concentrically said central sections of the links, said washers substantially filling the bore of said helical wire coil, but capable of a longitudinal movement therein, substantially as described.

2. In a flexible shaft comprising a helical wire coil C and a chain D inclosed therein and having links provided with a straight central section $c$ coincident with the axis of said shaft, the combination of a series of washers F, inclosing the central sections of said links concentrically, said washers being cut open radially to receive said links, and inclosing sleeves $g$, surrounding said washers and having their ends $g'$ turned inwardly, substantially as described.

3. In a flexible shaft consisting of an interior chain and an exterior coil, the sleeves C' and $A^3$, connected with said coil and chain, respectively, whereby a sliding motion is secured to said coil, as and for the purpose specified.

Dated the 8th day of April, 1890.

GEORGE H. COATES.

Witnesses:
RUFUS B. FOWLER,
JOHN E. WAKEFIELD.